(12) United States Patent
Sun et al.

(10) Patent No.: US 11,754,733 B2
(45) Date of Patent: Sep. 12, 2023

(54) SYSTEM AND METHOD FOR GENERATING A SEISMIC ATTENUATION MODEL

(71) Applicant: Chevron U.S.A. Inc., San Ramon, CA (US)

(72) Inventors: Yonghe J. Sun, Cypress, TX (US); Chunling Wu, Houston, TX (US); Mark Chengliang Fan, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 158 days.

(21) Appl. No.: 17/515,105

(22) Filed: Oct. 29, 2021

(65) Prior Publication Data

US 2023/0137100 A1 May 4, 2023

(51) Int. Cl.
*G01V 1/28* (2006.01)
*G01V 1/34* (2006.01)
*G01V 1/30* (2006.01)

(52) U.S. Cl.
CPC .............. *G01V 1/282* (2013.01); *G01V 1/306* (2013.01); *G01V 1/345* (2013.01); *G01V 2210/584* (2013.01)

(58) Field of Classification Search
CPC ........ G01V 1/282; G01V 1/306; G01V 1/345; G01V 2210/584
See application file for complete search history.

(56) References Cited

U.S. PATENT DOCUMENTS

2021/0231820 A1* 7/2021 Olaya .................. G01V 1/36

OTHER PUBLICATIONS

Andrew J. Carter et al., "Attenuation anisotropy and the Relative Frequency Content of Split Shear Waves," Geophys. J. Int. (2006) 165, pp. 865-874, The Authors.
Gilles Lambare, "Stereotomography," Geophysics, vol. 73, No. 5, Sep.-Oct. 2008, pp. VE25-VE34, Society of Exploration Geophysicists.

(Continued)

*Primary Examiner* — Daniel Pihulic
(74) *Attorney, Agent, or Firm* — Marie L. Clapp (57) ABSTRACT

A method is described for seismic imaging improved by an estimation of attenuation including receiving a pre-migration seismic dataset D(s, r; t) representative of a subsurface volume of interest wherein s indicates source location, r indicates receiver location, and t is the recorded travel time; calculating a pre-migration attenuated travel time t*(s, r; t); computing a time derivative of the pre-migration attenuated travel time wherein $1/Q(s, r; t) = \partial t^*(s, r; t)/\partial t$; performing a first migration on D(s,r;t) to generate common image point (CIP) gathers G(x, h) wherein x is subsurface image point and h is angle or offset; performing a second migration on $D(s, r; t)*1/Q(s, r; t)$ to generate weighted common image point (CIP) gathers $G_{1/Q}(x, h)$; and calculating a conditioned ratio of the weighted CIP gathers $G_{1/Q}(x, h)$ over the CIP gathers G(x, h) to get CIP gathers of 1/Q(x, h) is disclosed.

10 Claims, 6 Drawing Sheets

(56) References Cited

OTHER PUBLICATIONS

Jing Chen, "Specular Ray Parameter Extraction and Stationary-Phase Migration", Geophysics, vol. 69, No. 1, Jan.-Feb. 2004, pp. 249-256, Society of Exploration Geophysicists.

Kefeng Xin et al., "Robust Q Tomographic Inversion Through Adaptive Extraction of Spectral Features," SEG Denver 2014 Annual Meeting, pp. 3726-3730.

M. Tygel et al., "Multiple Weights in Diffraction Stack Migration," Geophysics, vol. 59, No. 12, Dec. 1993, pp. 1820-1830, Society of Exploration Geophysicists.

Norman Bleistein, "On The Imaging of Reflectors in the Earth", Geophysics, vol. 52, No. 7, Jul. 1987, pp. 931-942, Society of Exploration Geophysicists.

Qian Wang et al., "An Improved Peak Frequency Shift Method for Q Estimation Based on Generalized Seismic Wavelet Function," J. Geophys. Eng. 15, Jan. 18, 2018, pp. 164-178, Sinopec Geophysical Research Institute, Printed in the UK.

Youli Quan et al., "Seismic Attenuation Tomography Using the Frequency Shift Method," Geophysics, vol. 62, No. 3, May-Jun. 1997, pp. 895-905, Society of Exploration Geophysicists.

* cited by examiner

SYSTEM AND METHOD FOR GENERATING A SEISMIC ATTENUATION MODEL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for seismic imaging of subsurface reservoirs and, in particular, to a method of estimating attenuation (Q) models and compensating for Q in seismic imaging.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

One of the primary indicators of hydrocarbon accumulation is seismic amplitudes. Seismic wave propagations suffer energy attenuation because the Earth is not totally elastic. Frequency-independent quality factor (Q) has been found adequate to model seismic wave attenuation. Seismic imaging of the subsurface using reflection seismic data requires modeling the subsurface wave propagation velocity and attenuation properties. Tomographic approaches are the methods of choice for building velocity and attenuation (Q) models (see, e.g., Xin et al., 2014). Attenuation tomography input data can be obtained by analyzing pre-migration data in time (e.g., Quan and Harris, 1997) or by picking post-migration common-image-point gathers in depth. These conventional methods use depth-domain picking because the conventional tomographic methods require such inputs. Depth domain picking suffers from wavelet stretch (due to moveout, dip, and variable velocity) which alters the frequency content that the picking depends on. Amplitude information is important for attenuation analysis. Depth domain picking also suffers from other migration-induced amplitude distortions. Conventional tomographic methods for building Q models are usually costly in terms of manpower and project time.

Seismic data is processed to create seismic images that can be interpreted to identify subsurface geologic features including hydrocarbon deposits. The ability to define the location of rock and fluid property changes in the subsurface is crucial to our ability to make the most appropriate choices for hydrocarbon identification, safe operation, and successful completion of projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved estimation of attenuation in order to generate improved seismic images that will allow better seismic interpretation of potential hydrocarbon reservoirs.

SUMMARY

In accordance with some embodiments, a method of seismic imaging improved by an estimation of attenuation including receiving, at a computer processor, a pre-migration seismic dataset $D(s, r; t)$ representative of a subsurface volume of interest wherein s indicates source location, r indicates receiver location, and t is the recorded travel time; calculating, via the computer processor, a pre-migration attenuated travel time $t^*(s, r; t)$; computing, via the computer processor, a time derivative of the pre-migration attenuated travel time wherein $1/Q(s, r; t) = \partial t^*(s, r; t)/\partial t$; performing a first migration on $D(s,r;t)$ to generate common image point (CIP) gathers $G(x, h)$ wherein x is subsurface image point and h is angle or offset; performing a second migration on $D(s, r; t)*1/Q(s, r; t)$ to generate weighted common image point (CIP) gathers $G_{1/Q}(x, h)$; and calculating a conditioned ratio of the weighted CIP gathers $G_{1/Q}(x, h)$ over the CIP gathers $G(x, h)$ to get CIP gathers of $1/Q(x, h)$ wherein the conditioning prevents division by zero and Q is the seismic attenuation Q-factor is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging which compensates for attenuation.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DAS VSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

The present invention includes embodiments of a method and system for a method for obtaining attenuation (Q) models without the need for tomography at all. This has several advantages. One advantage is to save project time and cost because tomography is a time-consuming step and can take days or weeks to complete. Another advantage is that our approach does not require inversion and this solution avoids sensitivity to model parameterization and non-uniqueness commonly associated with inversion processes like tomography.

We first establish a few notations for our description. It has been shown that, within the seismic frequency band, frequency-independent Q factor is adequate to describe the frequency-dependent attenuation. The formulation is very conveniently described by a complex velocity $$V(x) = v_0(x) \cdot \left[1 + \frac{i}{2Q} + \frac{1}{\pi Q} \cdot \ln\left(\frac{\omega}{\omega_0}\right)\right]$$

where vector x=(x, y, z) represents an arbitrary subsurface spatial position, $\omega$ is the angular frequency, $\omega_0$ is a reference angular frequency, $v_0(x)$ is the real velocity at the reference frequency. For one-way wave propagation from a surface point s (e.g., a location of a source) to a subsurface point x (i.e., a vector position with x, y, z coordinates), the seismic amplitudes A(s, x; $\omega$) at x can be represented by $$A(s,x) = A_s \cdot \exp[i\omega T(s,x)],$$

where is $A_s = A(s, s)$ is the starting amplitude at s, and T(s, x) is the complex time $$T(s, x) = t(s, x) - \frac{i}{2} \cdot t^*(s, x) - \frac{1}{\pi} \cdot t^*(s, x) \cdot \ln\left(\frac{\omega}{\omega_0}\right).$$

In the above equation, t(s, x) is real traveltime along the ray path from s to x, $$t(s, x) = \int_{ray} \frac{d\sigma}{v_0},$$

and t*(s, x) is the "attenuated traveltime", $$t^*(s, x) = \int_{ray} \frac{d\sigma}{v_0 \cdot Q}.$$

Figure 1A:
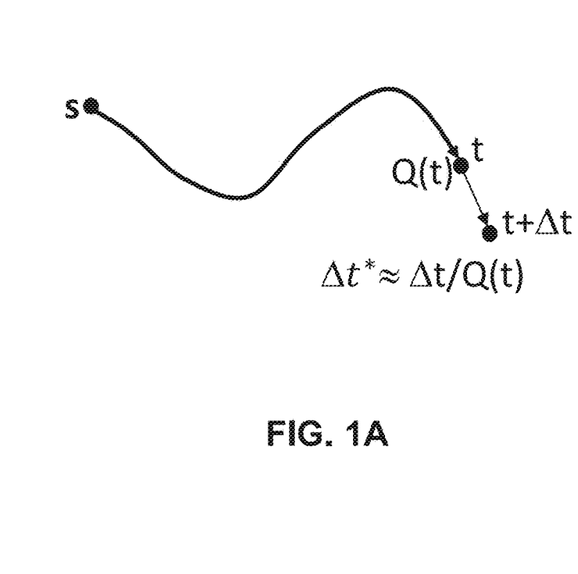
FIG. 1A illustrates incremental change of attenuated traveltime between two closely spaced points along a one-way transmission ray path.

The integrations are with respect to a ray path length parameter $\sigma$. The position x and the medium properties (i.e., Q and v) in the integrands can be viewed as functions of path length $\sigma$. If we use the travel time t instead of the path length $\sigma$ to parameterize the ray path with dt=d$\sigma$/v, then t*(s, x) can be expressed as $$t^*(s, x) = \int_{ray} \frac{dt}{Q},$$

where x and Q are considered functions of traveltime parameter t along the ray path. FIG. 1A illustrates this concept in differencing form: if we know the attenuation time at two adjacent points x(t) and x(t+$\Delta$t) separated by a traveltime $\Delta$t and attenuation time $\Delta$t* along a one-way ray, we have $$\Delta t^* \approx \Delta t / Q(t),$$

where Q(t) is understood to be Q(x(t)) as an implicit function of t along the ray path x(t).

Figure 1B:
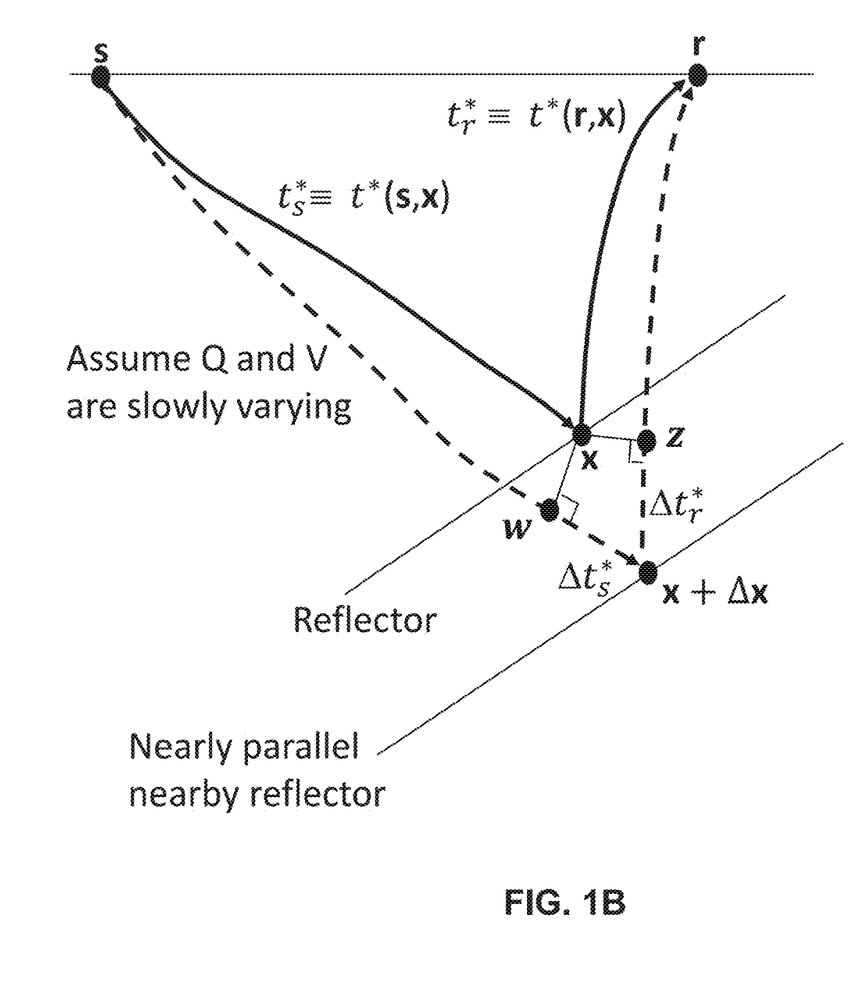
FIG. 1B illustrates incremental change of attenuated traveltimes and ray paths for two closely spaced reflection events.

We argue next that the above equation derived using a one-way ray path will approximately hold in form for two-way reflection data as well. For reflection data, the ray path has two legs: the source leg from the source point s to a subsurface reflection point x and the receiver leg from x to the receiver point r. See FIG. 1B. Two events separated by a small travel time difference $\Delta$t for the given s and r will correspond to two specular reflection points x and x+$\Delta$x separated by small displacement $\Delta$x. This assumes that v(x), Q(x), and reflector dip vector field n(x) are smoothly varying in space, that there is no multipathing, and that $t_s$-fronts (i.e., a surface of constant t(s, x)) and $t^*_s$-fronts (i.e., a surface of constant t*(s, x)) are nearly tangential in space. Under these assumptions, we have $$\Delta t^*_s \approx \Delta t_s / Q(x),$$

and $$\Delta t^*_r \approx \Delta t_r / Q(x),$$

where $\Delta t_s \equiv t(s, x+\Delta x) - t(s, x)$, $\Delta t^*_s \equiv t^*(s, x+\Delta x) - t^*(s, x)$, with similar definitions for $\Delta t_r$ and $\Delta t^*_r$. We thus have $$\Delta t^* \equiv \Delta t^*_s + \Delta t^*_r \approx \frac{\Delta t_s}{Q(x)} + \frac{\Delta t_r}{Q(x)} = \frac{\Delta t}{Q(t)}$$

to relate the attenuated traveltime increment $\Delta t^* \equiv \Delta t^*_s + \Delta t^*_r$ with the traveltime increment $\Delta t \equiv \Delta t_s + \Delta t_r$. Here Q(t) at the recording time t is understood to be the Q(x) at the specular reflection point x. In the limit of $\Delta t \to 0$, we obtain $$1/Q(s,r;t) \approx \partial t^*(s,r;t)/\partial t,$$

where the attenuated traveltime t*(s, r; t) can be picked from the spectra of each seismic trace as a function of s, r, and t. The effect of attenuative wave propagation on the data of D(s, r; t) varies with time and can be measured by partitioning the data with overlapping time windows. For the time window centered at time $t_{win}$, the spectrum is assumed be of the form $$G(s, r; t_{win}) = A(s, r; t_{win}) \cdot S(\omega) \cdot \exp\left[-\frac{\omega t^*(s, r; t_{win})}{2} + \frac{i \cdot t^*(s, r; t_{win})}{\pi} \cdot \omega \cdot \ln\left(\frac{\omega}{\omega_0}\right)\right]$$

where $S(\omega)$ is the source spectrum, A(s, r; $t_{win}$) accounts for geometric spreading and other factors insensitive to attenuation.

References abound in the literature on obtaining t* by linear fit of the log-spectral ratio $$\ln\left(\left|\frac{G(s, r; t_{win})}{G(s, r; t_{ref})}\right|\right) = \ln\left(\left|\frac{A(s, r; t_{win})}{A(s, r; t_{ref})}\right|\right) - \frac{\omega}{2} \cdot t^*(s, r; t_{win}),$$

where the $t_{ref}$ corresponds to the time window before the spectrum is affected by attenuation with t*(s, r; $t_{ref}$)=0. This provides the zero-attenuation reference spectrum for taking the spectral ratio. For marine data, the time at the water bottom reflection is a good candidate for the $t_{ref}$. The source spectrum can also be used for the reference spectrum. The above equation shows that attenuated time t* at $t_{win}$ can be found from slope in the best-fit line to the log-spectrum versus frequency plot. See Xin et al (2014) for a recent example of this approach. Quan and Harris (1997) proposed a frequency shift approach for estimating the attenuated time.

Since seismic imaging by migration back-projects recorded time-domain seismic energy back to the specular reflection points in the subsurface, we can use migrations to convert the 1/Q(s, r; t) from premigration time domain to the post-migration depth domain for earth model building, imaging and inversion. This leads us to the method 100 of FIG. 2 for obtaining common-image point gather of 1/Q by migrations.

Figure 2:
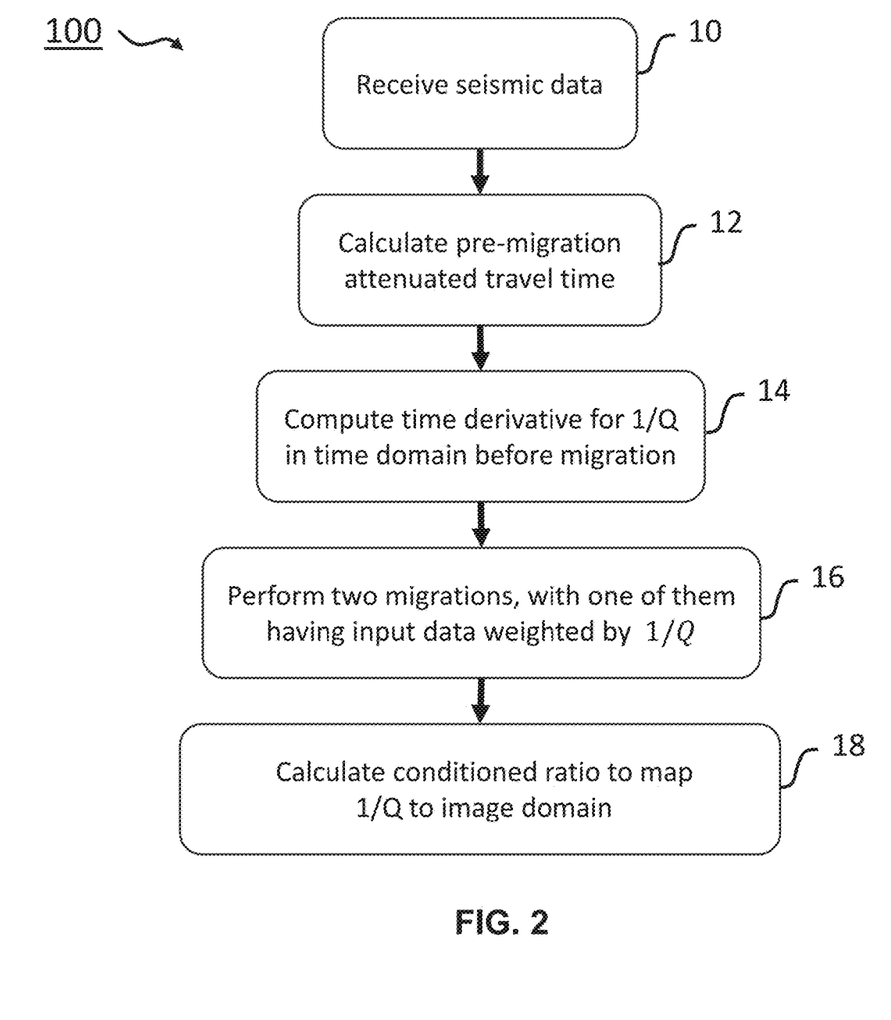
FIG. 2 illustrates a flowchart of a method of obtaining an attenuation (Q) model, in accordance with some embodiments.

FIG. 2 illustrates a flowchart of a method 100 for seismic imaging of a complex subsurface volume of interest. At operation 10, a pre-migration seismic dataset is received. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging. The premigration seismic dataset D(s, r; t) refers to a set of seismic traces with sources at location s and receivers at location r. The process does not require the input traces to be sorted into any particular order, such as common-source gathers (e.g., suitable for reverse time migration or RTM) or common-mid-point (CMP) gathers for Kirchhoff time migration.

At operation 12, the method calculates the pre-migration attenuated travel time t*(s, r; t) using premigration data D(s, r; t). The current invention also does not limit how t*(s, r; t) is picked in the premigration data D(s, r; t). In particular, because t*(s, r; t) is a sample-by-sample match in time to each individual trace position (s, r), it does not require any specific sort of the premigration data. In an embodiment, this operation may include a time-varying high-cut filter to avoid high frequency noise in the data while picking. A general recommendation for trace-wise windowed spectra R(s, r; f, t) is as follows:

For either land or marine data, t*(s, r; t) can be computed from the windowed spectral ratio of R (s, r; f; $t_{win}$) with S(s, r; f), where S(s, r; f) is the source spectrum, and $t_{win}$ is the time at the center of the window.

For marine data, t*(s, r; t) can be optionally and conveniently computed from the spectral ratio of windowed spectrum R(s, r; f; $t_{win}$) with R(s, r; f; $t_{wb}$), where $t_{wb}$(s, r) is the arrival time of the water bottom.

The literature on picking attenuated time using windowed seismic spectra is extensive. Quan and Harris (1997) using centroid frequency shift and Xin et al. (2014) using central frequency shift are but two examples. Wang and Gao (2018) suggest using peak frequencies instead of centroid frequencies. Carter and Kendall (2006) propose using dominant frequencies.

Figure 3:
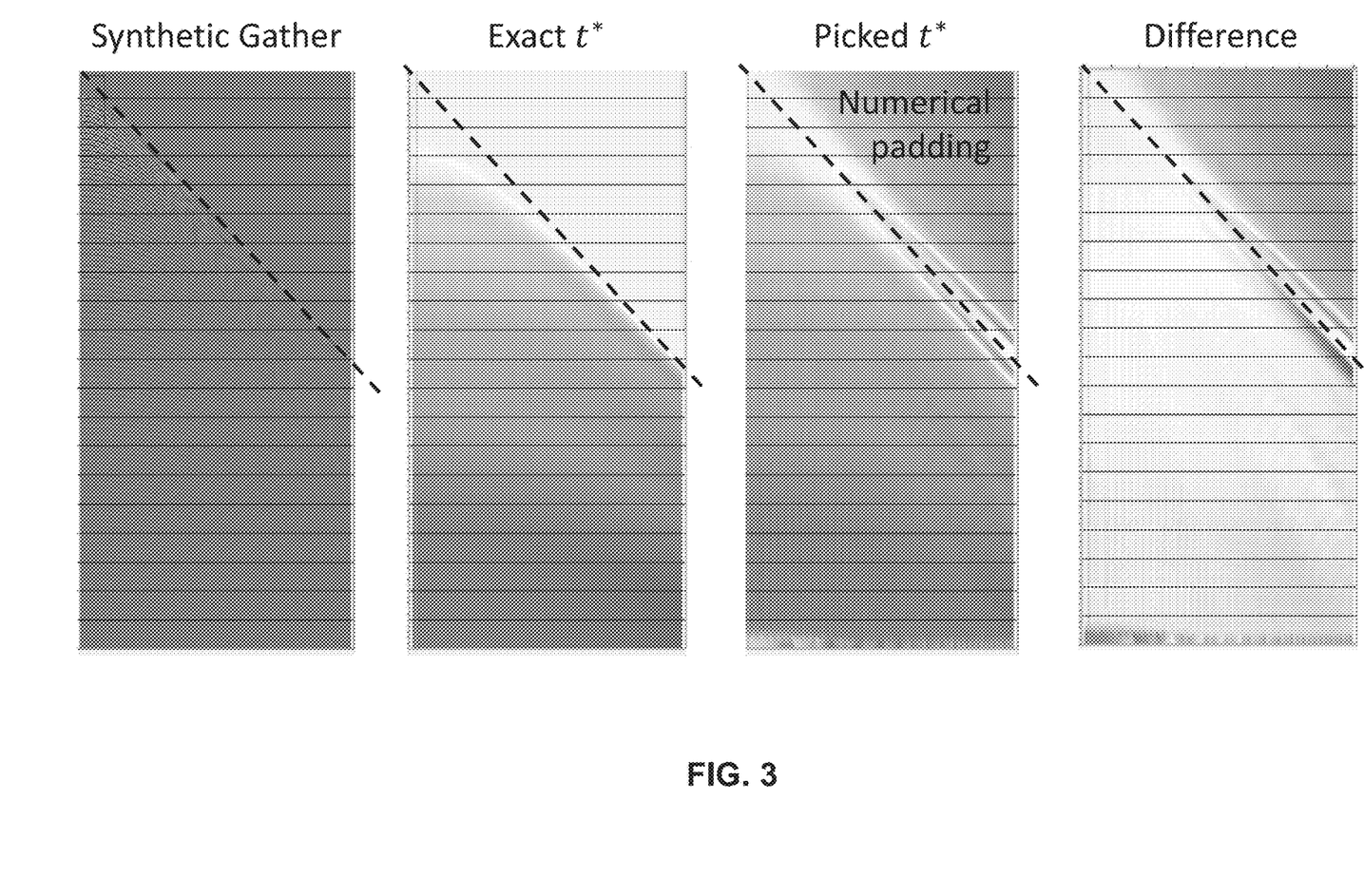
FIG. 3 illustrates steps and intermediate results, in accordance with some embodiments; From left to right: synthetic seismic gather with attenuation, gather of exact attenuated time t*, gather of picked t*, and difference between the picked t* and exact t*. The near-zero difference indicates that picked t* agrees well with the exact t*.

The pre-migration attenuated travel time is illustrated in FIG. 3 using a synthetic gather. Since it is a synthetic gather, the exact (i.e., true or actual) pre-migration attenuated travel time is known. This can be compared to the picked pre-migration attenuated travel time as shown in the "Diff" panel.

Figure 4:
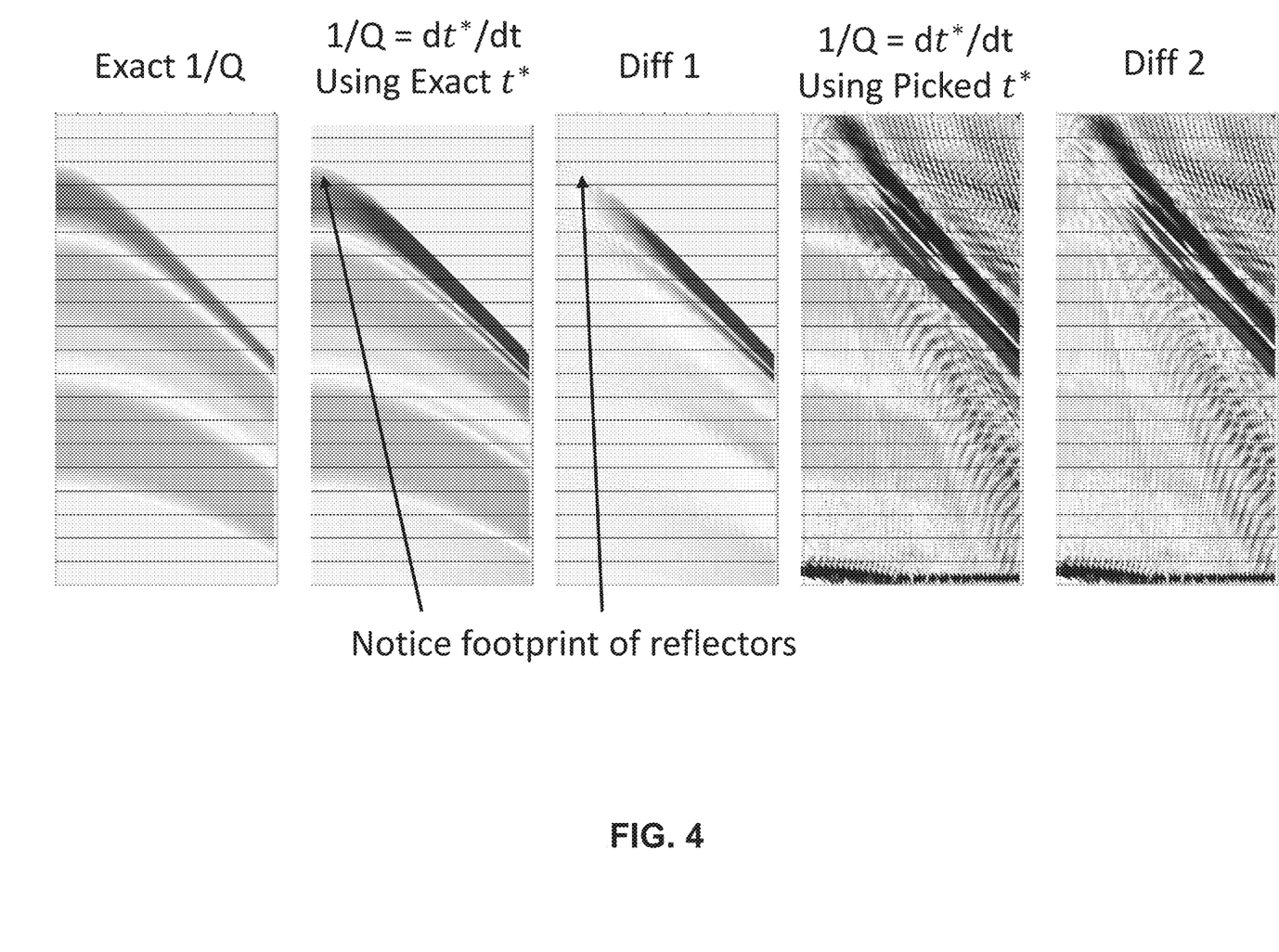
FIG. 4 illustrates steps and intermediate results, in accordance with some embodiments; From left to right: gather with exact 1/Q value, gather of 1/Q computed using exact t* based on the exact 1/Q value, difference with exact 1/Q value showing that ∂t*/∂t is a good approximation of 1/Q, gather of 1/Q computed using picked t*, and difference with exact 1/Q showing that the residual is dominated by noise.

Referring again to FIG. 2, at operation 14, the time derivative is computed such that 1/Q(s, r; t)=∂t*(s, r; t)/∂t as illustrated by FIGS. 1A and 1B. FIG. 4 illustrates a synthetic example wherein the exact 1/Q and the exact ∂t*(s, r; t)/∂t are known. Here, the "Diff 1" panel indicates the difference between the exact 1/Q and the exact ∂t*(s, r; t)/∂t and supports the idea that 1/Q(s, r; t)≈∂t*(s, r; t)/∂t, particularly at near angles/offsets. The "From picked ∂t*(s, r; t)/∂t" panel is based on the pre-migration attenuated travel time of operation 12 and the "Diff 2" panel is the difference between the exact 1/Q and picked ∂t*(s, r; t)/∂t panels. Although there is a footprint left by the synthetic reflectors in both the exact and picked cases, it is clear that this approximation for 1/Q is good.

At operation 16 of method 100, the method performs two migrations: one with input data D(s, r; t) to get the common-image point (CIP) image gather G(x, h), and another migration with input data D(s, r; t)·(1/Q(s, r; t)) to get the weighted CIP image gather $G_{1/Q}$(x, h). Here the variable h indicates the gather trace axis. It can be a scalar like absolute value of source-receiver offset or reflection angle. It can also be a vector like source-receiver offset vector or azimuth-reflector angle pair. Let M(x, h; s, r) be the migration kernel that yields the CIP gather G(x, h) given input D(s, r; t):

$$G(x,h)=\Sigma_s\Sigma_r M(x,h;s,r)\cdot D(s,r;t),$$

and $$G_{1/Q}(x,h)=\Sigma_s\Sigma_r M(x,h;s,r)\cdot D(s,r;t)\cdot(1/Q(s,r;t)).$$

The above approach of using weighted migrations to obtain specular reflection ray attributes has been applied in other contexts. Bleistein (1987) suggested weighted differential stack migration for obtain ray incident angles. Tygel et al. (1993) and Chen (2004) suggested using weights in differential stack migration to obtain reflection dip, specular sources and receivers at each subsurface image point x. Here we use the approach to map information about the subsurface (i.e., attenuation) that can be better analyzed in the time domain but are needed in the image domain.

Figure 5:
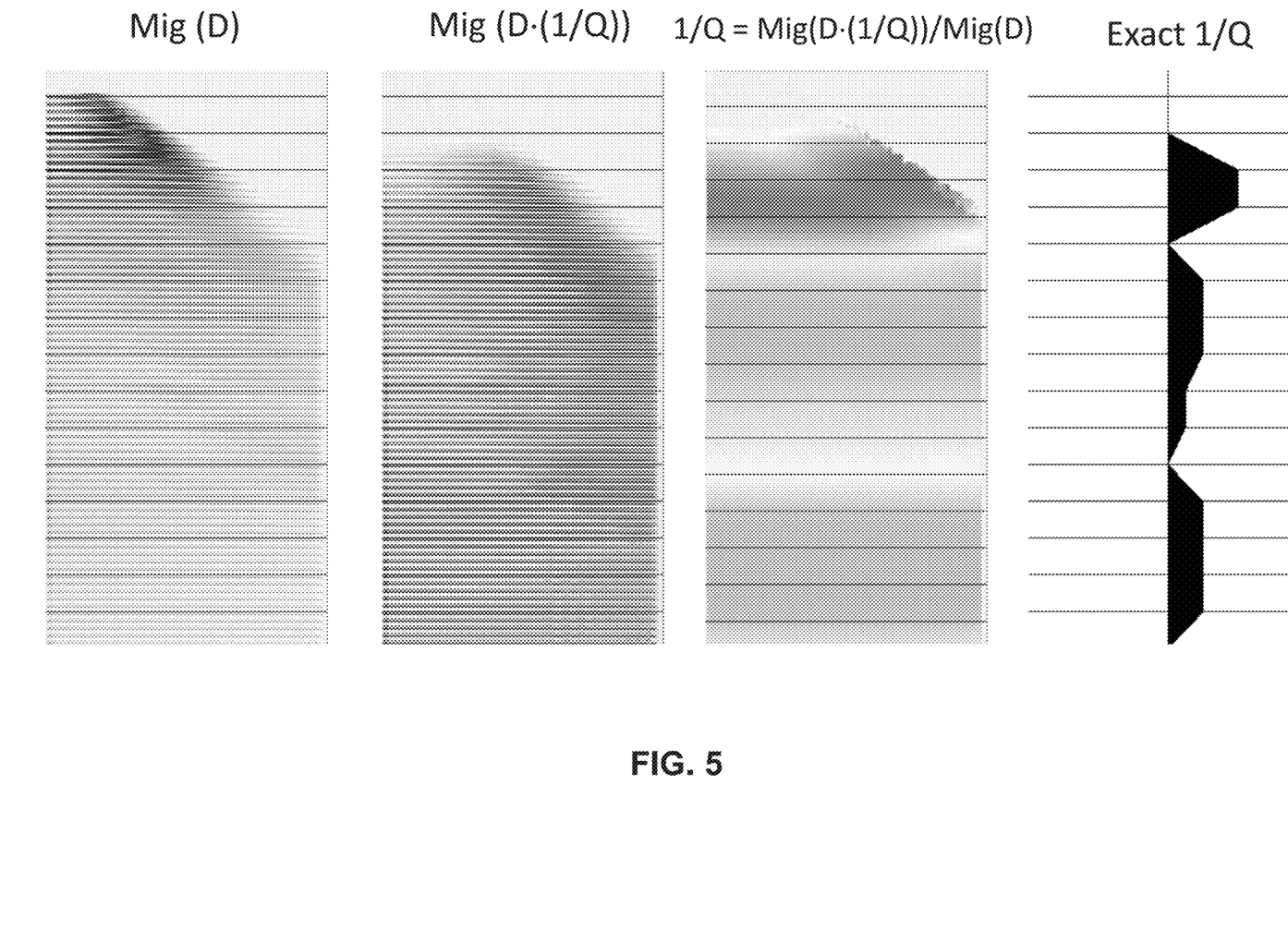
FIG. 5 illustrates steps and results, in accordance with some embodiments; From left to right: migration of the raw synthetic data [i.e., Mig(D)], migration of the synthetic data weighted by the 1/Q [i.e., Mig(D·1/Q)], a conditioned division to obtain common-image-point (CIP) of 1/Q, and the CIP gather of the exact 1/Q.

FIG. 5 shows a synthetic example with the first migration of D(s, r; t) (panel G(x, h)=Mig(D)) and the second migration of D(s, r; t)·(1/Q(s, r; t))(panel $G_{1/Q}$(x, h)=Mig(D·(1/Q))).

Operation 18 takes a conditioned ratio of the weighted migration $G_{1/Q}$(x, h) over the unweighted migration G(x, h) to get 1/Q(x, h):

$$1/Q(x, h) = \frac{\sum_{win} G_{1/Q}(x, h)\cdot G(x, h)}{\sum_{win} [G(x, h)]^2},$$

where the summation $\Sigma_{win}$( . . . ) is over a small spatial window around x. For image regions with non-vertical reflector dip, the summation can be over 1-D z-window with the width Δz on the order of a wavelength. The conditioning is to avoid division by 0 that would occur in a simple division of $G_{1/Q}$/G and to get the ratio 1/Q(x, h) that varies spatially smoothly and slowly in comparison with dominant wavelength of the wavelet which is rapidly varying.

FIG. 5 also shows this conditioned ratio of $G_{1/Q}$/G (panel 1/Q=Mig(D·(1/Q))/Mig(D)) and it can be compared to the exact 1/Q that is known because this is a synthetic. In an embodiment, the 1/Q(x, h) gather can be muted and stacked to get a 1/Q(x) model. Those of skill in the art are familiar with the process of muting, which zeroes out parts of traces at larger h and is done to remove noise before stacking (summing along the h axis). In another embodiment, the $1/Q(x, h)$ gather can also be used as a prestack seismic attribute to indicate mineral accumulations. For example, gas accumulation tend to increase attenuation. In still another embodiment, $1/Q(x, h)$ or a stacked version $1/Q(x)$ can be information to be incorporated to complete the set of model parameters (e.g., P-velocity, S-velocity, density, anisotropy, and attenuation) for seismic imaging and inversion.

The above process yields $1/Q$ models which contains the information for attenuation compensation. If Q (not just $1/Q$) is desired, one can obtain the Q-factor by taking the reciprocal. A minor complication is that $1/Q$ can be numerically zero or negative. A simple solution is reset negative and near zero $1/Q$ values to a small positive value (e.g., 0.0001 or in a range such as between 0-the absolute value of (the average of all $1/Q(x, h)$ values)*0.001).

We have just presented a method for computing $1/Q$ using premigration time-domain picking and stationary phase division of the multiple migrations, without using inversion or tomography. As stated earlier, the approach has several advantages over traditional approaches based on depth-domain picking and tomography based on 3D reflection data. Conventional methods use depth-domain picking because the current tomographic methods require such inputs. Depth domain picking suffers from wavelet stretch which alters the frequency content that the picking depends on. Amplitude information is important for attenuation analysis. Depth domain picking also suffers from migration-induced amplitude distortions. Conventional tomography requires picking despite these picking issues. However, tomography is a time-consuming process and, like most geophysics inverse problems, suffers from non-uniqueness. Our current invention avoids the shortcomings of tomography by avoiding tomography altogether.

Figure 6:
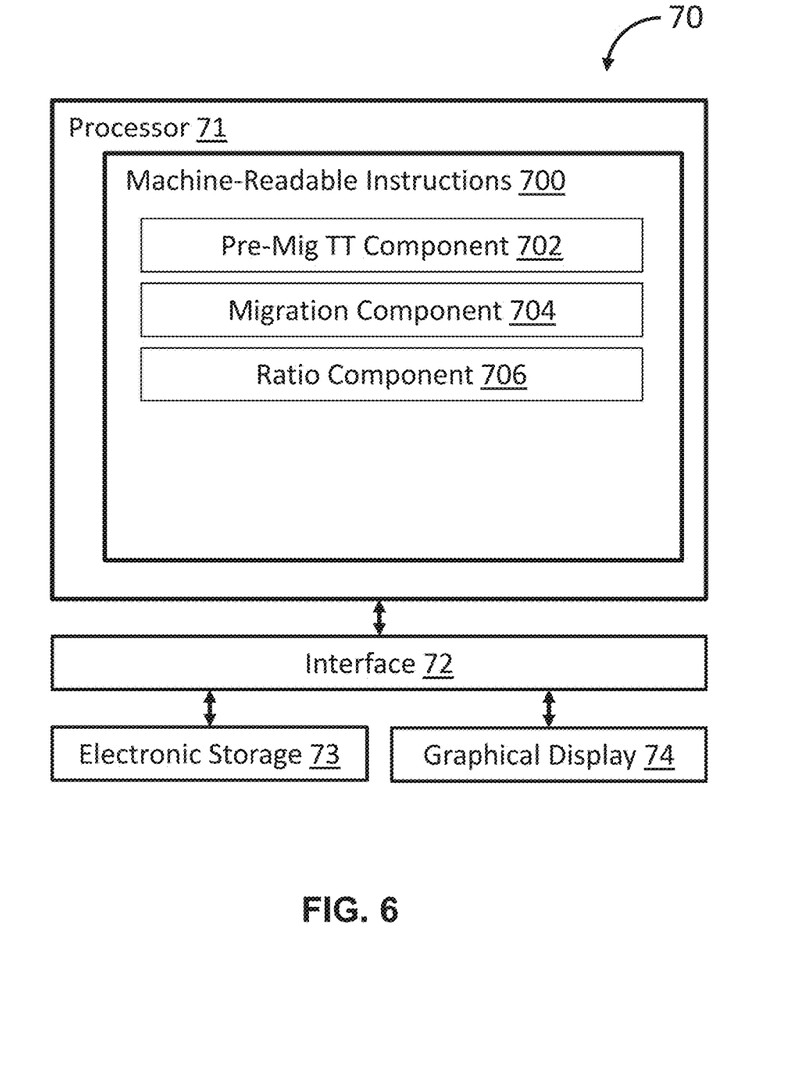
FIG. 6 is a block diagram illustrating a seismic imaging system, in accordance with some embodiments.

FIG. 6 is a block diagram illustrating a seismic attenuation system 70, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic attenuation system 70 includes one or more processors 71, one or more interfaces 72, non-transitory electronic storage 73, and a graphical display 74. Electronic storage 73 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Electronic storage 73 comprises a non-transitory computer readable storage medium and may store seismic data, velocity models, seismic images, and/or geologic structure information.

In some embodiments, electronic storage 73 stores the following programs, modules and data structures, or a subset thereof including an operating system, a network communication module, and machine-readable instructions 700.

The operating system includes procedures for handling various basic system services and for performing hardware dependent tasks. The network communication module facilitates communication with other devices via communication network interfaces (wired or wireless) and one or more communication networks, such as the Internet, other wide area networks, local area networks, metropolitan area networks, and so on.

In some embodiments, the machine-readable instructions 700 include a pre-migration travel time component 702 which is a set of instructions to execute operations 12 and 14 of method 100. The machine-readable instructions 700 also may include a migration component 704 which is a set of instructions to execute both migrations of operation 16 and a ratio component 706 which is a set of instructions to execute operation 18. Although specific operations have been identified for the components discussed herein, this is not meant to be limiting. Each component may be configured to execute operations identified as being a part of other components, and may contain other instructions, metadata, and parameters that allow it to execute other operations of use in processing data and generating images. For example, any of the components may optionally be able to generate a display that would be sent to and shown on the graphical display 74. In addition, any of the data or processed data products may be transmitted via the communication interface or the network interface and may be stored in electronic storage 73.

Method 100 is, optionally, governed by instructions that are stored in computer memory or a non-transitory computer readable storage medium (e.g., electronic storage 73 in FIG. 6) and are executed by one or more processors (e.g., processor 71) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

Bleistein, N., On the imaging of reflectors in the earth, GEOPHYSICS, VOL. 52, NO. 7 (JULY 1987); P. 931-942, 1 FIG.

Carter, A. J., and Kendall, J. M., 2006, Attenuation anisotropy and the relative frequency content of split shear waves, Geophys. J. Int. (2006) 165, 865-874

Chen, J., 2006, Specular ray parameter extraction and stationary phase migration, GEOPHYSICS, VOL. 69, NO. 1 (JANUARY-FEBRUARY 2004); P. 249-256, 7 FIGS Quan, Y, and Harris, J. M., 1997, Seismic attenuation tomography using the frequency shift method, GEOPHYSICS, VOL. 62, NO. 3 (MAY-JUNE 1997); P. 895-905

Tygel, M., Schleicher, J., Hubral, P., and Hanitzsch, C., Multiple weights in diffraction stack migration, GEOPHYSICS, VOL. 59, NO. 12 (DECEMBER 1993); P. 1820-1830, II FIGS.

Wang, Q., and Gao, J., 2018, An improved peak frequency shift method for Q estimation based on generalized seismic wavelet function, J. Geophys. Eng. 15 (2018) 164-178 (15pp)

Xin, K., He, Y., Xie, Y., Xu, W., Wang, M., 2014, Robust Q tomographic inversion through adaptive extraction of spectral features, 2014 SEG Annual Meeting Expanded Abstract

What is claimed is:

1. A computer-implemented method, comprising:
   a. receiving, at a computer processor, a pre-migration seismic dataset $D(s, r; t)$ representative of a subsurface volume of interest wherein s indicates source location, r indicates receiver location, and t is the recorded travel time;
   b. calculating, via the computer processor, a pre-migration attenuated travel time $t^*(s, r; t)$;
   c. computing, via the computer processor, a time derivative of the pre-migration attenuated travel time wherein $1/Q(s, r; t) = \partial t^*(s, r; t)/\partial t$;
   d. performing a first migration on $D(s,r;t)$ to generate common image point (CIP) gathers $G(x, h)$ wherein x is subsurface image point and h is angle or offset;
   e. performing a second migration on $D(s, r; t)*1/Q(s, r; t)$ to generate weighted common image point (CIP) gathers $G_{1/Q}(x, h)$; and
   f. calculating a conditioned ratio of the weighted CIP gathers $G_{1/Q}(x, h)$ over the CIP gathers $G(x, h)$ to get CIP gathers of $1/Q(x, h)$ wherein the conditioning prevents division by zero and Q is the seismic attenuation Q-factor.

2. The method of claim 1 further comprising muting and stacking the $1/Q(x, h)$ gathers along the h axis to generate a $1/Q(x)$ model.

3. The method of claim 1 further comprising generating an attenuation (Q) model by taking a reciprocal of the $1/Q(x, h)$ wherein any negative or near zero $1/Q(x, h)$ values are first set to a value between $0-|\text{Average}(1/Q(x, h))*0.001|$.

4. The method of claim 1 further comprising displaying the $1/Q(x, h)$ gathers on a graphical display.

5. The method of claim 2 further comprising displaying the $1/Q(x)$ model on a graphical display.

6. The method of claim 3 further comprising displaying the Q model on a graphical display.

7. A computer system, comprising:
   one or more processors;
   memory; and
   one or more programs, wherein the one or more programs are stored in the memory and configured to be executed by the one or more processors, the one or more programs including instructions that when executed by the one or more processors cause the system to:
   a. receive, at the one or more processors, a pre-migration seismic dataset $D(s, r; t)$ representative of a subsurface volume of interest wherein s indicates source location, r indicates receiver location, and t is the recorded travel time;
   b. calculate a pre-migration attenuated travel time $t^*(s, r; t)$;
   c. compute a time derivative of the pre-migration attenuated travel time wherein $1/Q(s, r; t) = \partial t^*(s, r; t)/\partial t$;
   d. perform a first migration on $D(s,r;t)$ to generate common image point (CIP) gathers $G(x, h)$ wherein x is subsurface image point and h is angle or offset;
   e. perform a second migration on $D(s, r; t)*1/Q(s, r; t)$ to generate weighted common image point (CIP) gathers $G_{1/Q}(x, h)$; and
   f. calculate a conditioned ratio of the weighted CIP gathers $G_{1/Q}(x, h)$ over the CIP gathers $G(x, h)$ to get CIP gathers of $1/Q(x, h)$ wherein the conditioning prevents division by zero and Q is the seismic attenuation Q-factor.

8. The system of claim 7 further comprising muting and stacking the $1/Q(x, h)$ gathers along the h axis to generate a $1/Q(x)$ model.

9. The system of claim 7 further comprising generating an attenuation (Q) model by taking a reciprocal of the $1/Q(x, h)$ wherein any negative or near zero $1/Q(x, h)$ values are first set to a value between $0-|\text{Average}(1/Q(x, h))*0.001|$.

10. A non-transitory computer readable storage medium storing one or more programs, the one or more programs comprising instructions, which when executed by an electronic device with one or more processors and memory, cause the device to:
  a. receive, at the one or more processors, a pre-migration seismic dataset D(s, r; t) representative of a subsurface volume of interest wherein s indicates source location, r indicates receiver location, and t is the recorded travel time;
  b. calculate a pre-migration attenuated travel time t*(s, r; t);
  c. compute a time derivative of the pre-migration attenuated travel time wherein $1/Q(s, r; t) = \partial t^*(s, r; t)/\partial t$;
  d. perform a first migration on D(s,r;t) to generate common image point (CIP) gathers G(x, h) wherein x is subsurface image point and h is angle or offset;
  e. perform a second migration on D(s, r; t)*1/Q(s, r; t) to generate weighted common image point (CIP) gathers $G_{1/Q}(x, h)$; and
  f. calculate a conditioned ratio of the weighted CIP gathers $G_{1/Q}(x, h)$ over the CIP gathers G(x, h) to get CIP gathers of 1/Q(x, h) wherein the conditioning prevents division by zero and Q is the seismic attenuation Q-factor.

* * * * *